United States Patent [19]

Robota et al.

[11] 4,317,805

[45] Mar. 2, 1982

[54] REMOVAL OF HYDROGEN FLUORIDE FROM GASEOUS MIXTURES OF HYDROGEN FLUORIDE AND HYDROGEN CHLORIDE

[75] Inventors: Stephen Robota, North Tonawanda; Yusuf A. Baxamusa, Tonawanda, both of N.Y.

[73] Assignee: Hooker Chemicals & Plastics Corp., Niagara Falls, N.Y.

[21] Appl. No.: 159,751

[22] Filed: Jun. 16, 1980

Related U.S. Application Data

[63] Continuation of Ser. No. 6,615, Jan. 25, 1979, abandoned.

[51] Int. Cl.³ .............................................. B01D 53/34
[52] U.S. Cl. ................................... 423/240; 423/481; 423/488; 423/490
[58] Field of Search ............... 423/240, 241, 481, 488, 423/490; 55/71, 74

[56] References Cited

U.S. PATENT DOCUMENTS 3,140,916  7/1964  Lowdermilk ..................... 423/488
3,976,447  8/1976  Merchant et al. ............... 423/488 X
4,009,214  2/1977  Sze et al. ........................ 423/488 X
4,128,626  12/1978  Merchant ........................ 423/488

FOREIGN PATENT DOCUMENTS 1379739  1/1975  United Kingdom ............... 423/488

OTHER PUBLICATIONS

Poulenc, "Annales de Chimie et de Physique", vol. 2, Series 7, 1894, pp. 24 and 26.
Slesser et al., "Preparation, Properties and Technology of Fluorine and Organic Fluoro Compounds", McGraw-Hill Book Co., New York, 1st Ed., 1951, pp. 66 and 67.
Turnbull et al., Analysis and Disposal of Fluorine", Industrial and Engineering Chemistry, vol. 39, No. 3, pp. 286, 288.

Primary Examiner—Earl C. Thomas
Attorney, Agent, or Firm—William J. Crossetta, Jr.; Arthur S. Cookfair

[57] ABSTRACT

A method of removing hydrogen fluoride from gaseous mixtures of hydrogen fluoride and hydrogen chloride, which contain up to about 5 percent by weight of hydrogen fluoride, is described. The method comprises initially contacting the gaseous mixture with a particulate, substantially anhydrous, bed of alkaline earth metal chloride material, for example, calcium chloride, to produce an effluent gas mixture having a substantially reduced hydrogen fluoride content. The effluent gas is then contacted with a secondary treatment bed of particulate, substantially anhydrous, alkaline earth metal chloride material, for example, calcium chloride, to produce a product gas containing less than 20 ppm of hydrogen fluoride. The temperature of the secondary treatment bed is maintained in the range from about −20° to about +20° C., and, more preferably, in the range from about 0° to about 5° C. The temperature of the secondary treatment bed may be controlled by control of the amount of hydrogen fluoride in the gas mixture entering the secondary treatment bed and by the use of an intervening gas cooling step.

4 Claims, 1 Drawing Figure

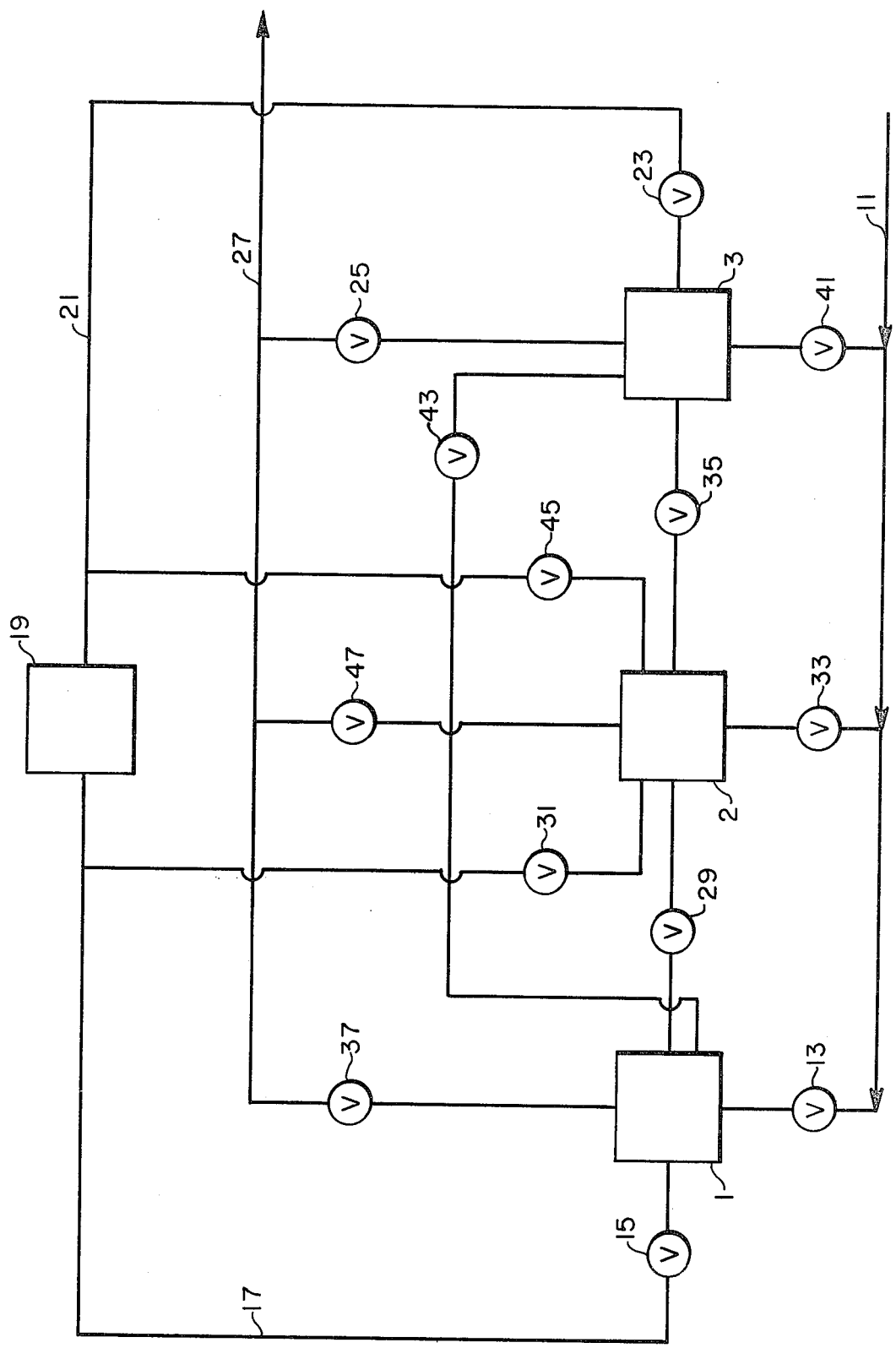

REMOVAL OF HYDROGEN FLUORIDE FROM GASEOUS MIXTURES OF HYDROGEN FLUORIDE AND HYDROGEN CHLORIDE

This is a continuation of application Ser. No. 6,615, filed Jan. 25, 1979, and now abandoned.

BACKGROUND OF THE INVENTION

The present invention relates to the removal of hydrogen fluoride from gaseous mixtures of hydrogen fluoride and hydrogen chloride. In accord with the present invention, a gaseous mixture containing hydrogen fluoride and hydrogen chloride is placed in contact with, suitably by passing a gas stream through a bed of, an anhydrous alkaline earth metal chloride, such as calcium chloride.

Various techniques to purify hydrogen chloride gas have been proposed which utilize a reaction between hydrogen fluoride and various alkali earth metal halides, other than fluorides, to produce alkaline earth metal fluorides and a purified hydrogen chloride gas. Examples of prior art methods are found in U.S. Pat. Nos. 3,140,916; 3,976,447; and 4,009,214; and British Pat. No. 1,379,793.

In most chemical processes utilizing hydrogen fluoride gas as a fluorinating agent to convert a chlorine-containing organic compound to a fluorine-containing compound, a hydrogen chloride by-product gas is produced containing unreacted hydrogen fluoride. The amount of hydrogen fluoride in the by-product gas varies widely, dependent upon the fluorination reaction, but ranging typically from about 0.5 to about 30.0 percent by weight of the gas mixture. Such by-product gas represents a significant potential economic loss unless the hydrogen fluoride can be separated from the otherwise marketable hydrogen chloride gas. The methods previously proposed either fail to provide a viable separation or fail to reliably and consistently produce a hydrogen chloride product which has a hydrogen fluoride content sufficiently low that it is commercially marketable. If the hydrogen fluoride content is sufficiently low, the hydrogen chloride gas may be liquified and marketed as anhydrous chloride, or it may be adsorbed in water to produce muriatic acid. Muriatic acid is normally sold in concentrations ranging from about 32 to about 36 percent by weight hydrogen chloride. It is desirable that anhydrous hydrogen chloride or muriatic acid products, especially in view of the present ecological concern in regard to low fluoride content of plant effluent, have extremely low concentrations of hydrogen fluoride. It is not unusual at the present time for industrial specifications to recite a maximum of less than 50 ppm (parts per million) residual hydrogen fluoride in anhydrous hydrogen chloride or muriatic acid products.

The present invention is particularly adapted to the treatment of by-product gas mixtures of hydrogen chloride containing hydrogen fluoride in minor amounts as an impurity. By minor amounts is meant that the amount of hydrogen fluoride present is such that it is more economical to recover the hydrogen chloride rather than the hydrogen fluoride. Usually, if the hydrogen fluoride content of the mixture is above about 5.0 percent and, more practically, above about 3.0 percent by weight, it is more economical to initially treat the by-product mixture to recover hydrogen fluoride. Such treatment may suitably be by a low temperature refrigeration process in which hydrogen fluoride is condensed out of the mixture and recovered, or by a reaction with sodium fluoride to produce a bifluoride, followed by a thermal decomposition to recover hydrogen fluoride. Typically, the hydrogen chloride by-product of these processes contains amounts of hydrogen fluoride which render the product non-marketable by today's standards, but such mixtures are aptly suited to use in the present process.

The amount of hydrogen fluoride gas that will be removed by a bed of alkaline earth metal chloride material is dependent on (1) the bed temperature, i.e., the cooler the bed, the more effectively the bed will remove hydrogen fluoride; and (2) the amount of hydrogen fluoride absorbed by the bed, i.e., as the bed progressively becomes converted from an alkaline earth metal chloride to alkaline earth metal fluoride, the less effectively the bed will remove additional hydrogen fluoride.

The reaction of hydrogen fluoride and an alkaline earth metal chloride material, such as calcium chloride, is exothermic. It has now been determined that the temperature increase in such reaction is about 23° C., for each 1 percent by weight hydrogen fluoride. Thus, for a gas mixture containing 2 percent by weight, the calcium chloride bed increases about 46° C., and, for a gas mixture containing 5 percent hydrogen fluoride, the increase in temperature is about 115° C.

The useful life of a calcium chloride bed may be determined by reference to the following equation:

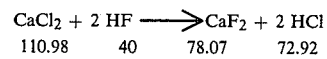

$$CaCl_2 + 2\ HF \longrightarrow CaF_2 + 2\ HCl$$
$$110.98 \qquad 40 \qquad 78.07 \qquad 72.92$$

Thus, knowing the weight of the initial calcium chloride charge, the hydrogen fluoride content in the gas to be treated, and the rate of gas flow, the useful life of the calcium chloride bed may be calculated.

The present application is directed to a process for removing hydrogen fluoride from gaseous mixtures of hydrogen chloride and hydrogen fluoride in which the initial mixture contains less than about 5.0 percent by weight hydrogen fluoride. The hydrogen chloride product of the present process normally contains less than 20 ppm of hydrogen fluoride.

GENERAL DESCRIPTION OF THE INVENTION

The present invention provides a method of removing hydrogen fluoride from gas mixtures containing hydrogen chloride and hydrogen fluoride, containing up to about 5 percent by weight hydrogen fluoride and, more preferably, less than about 3 percent by weight hydrogen fluoride. The method comprises initially contacting the gaseous mixture with a particulate, substantially anhydrous, bed of alkaline earth metal chloride material, suitably and preferably calcium chloride, to produce an effluent gas mixture having a reduced hydrogen fluoride content, usually less than about 0.1 percent by weight and, more preferably, less than 150 ppm. The effluent gas is then contacted with a secondary treatment or scrubber bed of particulate, substantially anhydrous, alkaline earth metal chloride material, suitably and preferably calcium chloride, to produce a product gas mixture containing less than 20 ppm of hydrogen fluoride. The temperature of the secondary treatment or scrubber bed is maintained with the broad cooling range of from about −20° to about +20° C., and more preferably, in the range of from about 0° to about 5° C.. The temperature of the scrubber bed is preferably controlled by an intervening gas cooling step carried out by known gas cooling techniques and by control of the amount of hydrogen fluoride in the entering gas mixture within a range where the exothermic reaction does not reach temperatures outside the cooling range.

It will be understood that the gaseous mixtures containing hydrogen chloride and hydrogen fluoride which are adapted to be treated by the present process may also contain other gases, such as volatile organic gases, e.g., halogenated hydrocarbons, inert gases or air, which are inert to alkaline earth metal halides.

The present invention also provides a method of purifying a gaseous mixture of hydrogen chloride containing hydrogen fluoride as an impurity on a continuous basis by utilizing a plurality of beds of alkaline earth metal chloride materials in sequence with an intermediate cooling means. In an arrangement facilitating a continuous operation, the impure gas mixture is directed through an initial particulate bed of alkali earth metal chloride material, through a cooling means and through a scrubber bed of particulate alkaline earth metal chloride material. The initial bed of alkaline earth metal chloride material is utilized until it reaches about half life, that is, until it is about 50 percent converted to the corresponding fluoride. A replacement bed of particulate, substantially anhydrous, alkaline earth metal chloride material is then placed on stream intermediate the initial, partially depleted, bed and the cooling means. The process is then continued until the initial bed is greater than about 80 percent depleted. At that point, the initial bed is removed, and the gas stream directed solely through the replacement bed. When the replacement bed is about 50 percent converted to the corresponding fluoride, a fresh replacement bed of alkaline earth metal chloride material is placed on stream intermediate the original replacement bed and the cooling means. The sequence of utilizing a single bed until it is about 50 percent depleted, then utilizing the partially depleted bed and a fresh bed in tandem until the partially depleted bed is at least about 80 percent depleted, and then removing the depleted bed is repeated to facilitate a continuous process which efficiently utilizes the alkaline earth metal chloride bed material. In a preferred mode of the continuous operation, the secondary treatment, or scrubber, bed of alkaline earth metal chloride material is also utilized as a replacement bed and it, in turn, is replaced by a fresh bed of alkaline earth metal chloride material.

DETAILED DESCRIPTION OF THE INVENTION

The present invention will be illustrated and more particularly described by reference to the attached drawing. The drawing is a schematic representation of a typical arrangement of process equipment which may be utilized to carry out the present invention.

Looking now at the drawing in detail, an incoming gas stream of hydrogen chloride containing less than about 5 percent and, most preferably, less than about 3 percent hydrogen fluoride, by weight, as a contaminant is fed through line 11, through valve 13 and through absorption tower 1. Tower 1 is charged with a bed of particulate, substantially anhydrous, alkaline earth metal chloride. Although other alkaline earth metal chlorides are useful, calcium chloride, because of its relatively low cost, is eminently suited to use as the bed material in each of the towers 1, 2 and 3. Hydrogen fluoride in the gaseous feed mixture reacts with the alkaline earth chloride bed material to produce alkaline earth fluoride and a gas mixture containing a reduced amount of hydrogen fluoride. This gas exits tower 1 through valve 15, through line 17 and into cooler 19. Cooler 19 may be selected from commercially available cooling or chilling equipment. Cooler 19, suitably operating by circulation of chilled water, or refrigerant, produces sufficient cooling that the gas mixture exiting cooler 19 is maintained in the temperature range between about −20° and about +20° C. The cooled effluent gas from cooler 19 exits through line 21, through valve 23 into tower 3. Tower 3 is charged with a bed of particulate, substantially anhydrous, alkaline earth metal chloride, similar to tower 1. Tower 3 in this sequence houses the secondary treatment, or scrubber, bed. The scrubber bed temperature is maintained within the broad range of from about −20° to about +20° C. and, more preferably, in the range of from about 0° to about 5° C. After passing through the bed of tower 3, the treated gas exits tower 3 through valve 25 and flows into treated product line 27. In this sequence, valves 13, 15, 23 and 25 are open, all other valves are closed. Typically, the treated gas product exiting line 27 contains less than 20 ppm hydrogen fluoride.

As the alkaline earth metal chloride in tower 1 reaches its half-life, when about 50 percent by weight of the chloride has been converted to fluoride, the hydrogen fluoride content of the effluent gas exiting tower 1 increases gradually, at first, and then rapidly approaches the hydrogen fluoride content of the entering gas. When the point of about 50% conversion is reached, the flow sequence is changed to bring tower 2 on stream in series with tower 1 to receive the effluent from tower 1. This may be done by opening valves 29 and 31 and closing valve 15. In this sequence, only valves 13, 29, 31, 23 and 25 are open, all others are closed.

As the alkaline earth metal chloride bed in tower 1 becomes exhausted, converted to the corresponding fluoride, valve 33 is opened, and valves 13 and 29 are closed. In this sequence, tower 2 is the single primary reactor and valves 33, 31, 23 and 25 are open, all other valves are closed. During this sequence, tower 1 is purged, discharged and charged with a new bed of fresh alkaline earth metal chloride.

As the alkaline earth metal chloride charge in tower 2 reaches its half-life, and the amount of hydrogen fluoride in the gas mixture exiting tower 2 gradually increases, at first, and then rapidly approaches the amount in the entering gas mixture, the sequence is changed to bring tower 3 on line with tower 2, as primary absorption towers, and to utilize tower 1 as the secondary absorption tower. This may be done by opening valves 35, 15 and 37 and closing valve 25. In this sequence, valves 33, 35, 23, 15 and 37 are open, all other valves are closed.

As the charge of alkaline earth metal chloride in tower 2 reaches exhaustion, tower 3 is utilized as the sole primary absorption tower. This is done by opening valve 41 and closing valves 33 and 35. Tower 2 is now off stream and is purged, discharged and recharged with fresh alkaline earth metal chloride material. In this sequence, valves 41, 23, 15 and 37 are open, all other valves are closed.

As the charge in tower 3 reaches its half-life, absorption tower 1 is placed on stream with tower 3 as primary absorption towers, and tower 2 is placed on stream as the secondary tower. This is suitably done by opening valves 43, 15, 45 and 47 and closing valve 23. In this sequence, valves 41, 43, 15, 45 and 47 are open, all other valves are closed.

As the charge in tower 3 reaches exhaustion, tower 3 is taken off stream, and tower 1 is utilized as the primary absorption tower. This is done by closing valves 41 and 43 and opening valve 13. Tower 3 is then purged, discharged and recharged with fresh alkaline earth metal chloride material. In this sequence, valves 13, 15, 45 and 47 are open, all other valves are closed.

As the charge in tower 1 reaches its half-life, tower 2 is placed on stream in series with tower 1, and tower 3 is utilized as the secondary absorption tower. This may be done by opening valves 29, 31, 23 and 25 and closing valves 15, 45 and 47. In this sequence, valves 16, 29, 31, 23 and 25 are open, all other valves are closed.

It will be recognized that the last-described sequence completes a sequence cycle. The cycle is repeated to facilitate a continuous process for the removal of hydrogen fluoride from gas mixtures, thereby continuously producing a gas product containing a maximum average of less than 12 ppm of hydrogen fluoride.

EXAMPLE

Three carbon steel jacketed reactors were charged with 500 g of particulate calcium chloride. The theoretical life of a charge, based on a flow rate of an available gas mixture containing 0.15 g/m hydrogen fluoride and 8.7 g/m hydrogen chloride (about 1.7% by weight), was calculated to be about 20 hours. The reactors were arranged and utilized in the sequences described above for towers 1, 2 and 3. The stoichiometric half-life of a reactor charge was calculated to be about 10 hours, and the sequences were changed on an approximate 10 hour basis. The temperature maintained in the secondary or scrubber bed was between about 1° and about 3° C. The product stream was continuously monitored to determine the hydrogen fluoride content.

The results are tabularized below. Thus, in the initial sequence, reactor one was utilized as the primary reactor for a period of 10 hours. The sequence utilized as 1-C-3, that is, reactor one, cooler, reactor three. In this sequence, the effluent from reactor three averaged 2 ppm hydrogen fluoride. After 10 hours, the hydrogen fluoride content of the gas exiting from reactor one varied from about 150 ppm to a value approaching 1.7% by weight. At this point, reactor two was placed on stream in series with reactor one. In this sequence, the effluent from reactor three averaged 6.9 ppm hydrogen fluoride. At the end of twenty hours, reactor one was taken off stream to be recharged. The charge in reactor one was found to be 91.4 percent converted from calcium chloride to calcium fluoride.

TABLE 1

| Sequence Number | Length of Sequence in Hours | Total Hours of Operation | Average HF in Treated Gas (ppm) | Reactor Sequence | Reactor Conversion |
|---|---|---|---|---|---|
| 1 | 10 | 10 | 2.0 | 1-C-3 | — |
| 2 | 10 | 20 | 6.9 | 1-2-C-3 | 91.4% |
| 3 | 13.5 | 33.5 | 5.4 | 2-C-3 | — |
| 4 | 9.5 | 43.0 | 2.3 | 2-3-C-1 | 88.2% |
| 5 | 12.5 | 55.5 | 7.5 | 3-C-1 | — |
| 6 | 7.5 | 63.0 | 3.2 | 3-1-C-2 | 89.1% |
| 7 | 6.0 | 69.0 | 11.8 | 1-C-2 | — |
| 8 | 13.0 | 82.0 | 1.7 | 1-2-C-3 | 94.2% |
| 9 | 10.5 | 92.5 | 1.8 | 2-C-3 | — |

TABLE 1-continued

| Sequence Number | Length of Sequence in Hours | Total Hours of Operation | Average HF in Treated Gas (ppm) | Reactor Sequence | Reactor Conversion |
|---|---|---|---|---|---|
| 10 | 9.5 | 102.0 | 1.5 | 2-3-C-1 | 91.8% |
| 11 | 10.0 | 112.0 | 3.1 | 3-C-1 | — |
| 12 | 10.0 | 122.0 | 13.4 | 3-1-C-2 | 97.5% |
| 13 | 10.0 | 132.0 | 1.0 | 1-C-2 | — |
| 14 | 10.0 | 142.0 | 0.9 | 1-2-C-3 | 93.7% |

Although the present invention has been described in detail in a preferred mode, that is, having a gas cooling means positioned to cool the gas entering the secondary treatment or scrubber bed, it will be understood that alternatively, the secondary treatment bed itself may be cooled by cooling means, such as cooling coils, positioned in and/or around the secondary bed. However, such mode is not usually preferred because of the additional cooling capacity required for each bed if the beds are utilized in a sequential operation such as is described above.

Although the present invention has been described with respect to several embodiments, it is not to be construed as limited to these, as it will be evident to one of ordinary skill in the art that substitution and equivalents are possible without departing from the spirit of the invention or the scope of the appended claims.

What is claimed is:

1. A method of continuously removing hydrogen fluoride from a gaseous mixture containing up to about 5 percent by weight hydrogen fluoride which comprises the steps of:
   (a) contacting said initial gas mixture with a first bed of particulate, substantially anhydrous, alkaline earth metal chloride material to produce an effluent gas mixture having a hydrogen fluoride content substantially less than that of the initial gas mixture.
   (b) controlling the temperature of said effluent gas within the range of about −20° and about +20° C.,
   (c) contacting said effluent gas with a secondary bed of particulate, substantially anhydrous, alkaline earth metal chloride material maintained at a temperature between about −20° and about +20° C. to produce a gas mixture containing less than 20 ppm hydrogen fluoride,
   (d) carrying out said contact in step (a) until said alkali earth metal chloride material in said bed is partially depleted by being about 50 percent converted to the corresponding fluoride,
   (e) placing a replacement bed of particulate, substantially anhydrous, alkaline earth metal chloride material in series with said partially depleted bed so that the gaseous effluent from said partially depleted bed is directed to contact said replacement bed prior to cooling,
   (f) carrying out the contact in step (e) until the alkaline earth metal chloride material in said partially depleted bed is at least about 80 percent converted to corresponding fluoride,
   (g) removing said depleted bed from contact with the gas mixture by directing the gas mixture to solely contact said replacement bed,
   (h) carrying out said contact in step (g) until said replacement bed is about 50 percent converted to the corresponding fluoride, and
   (i) repeating steps (e), (f), (g) and (h).

2. The method of claim 1 wherein the alkaline earth metal chloride is calcium chloride.

3. The method of claim 1 wherein the temperature of the secondary bed is maintained between about 0° and about 5° C.

4. The method of claim 1 wherein the said secondary bed in step (c) is utilized as a replacement bed, and a fresh bed of alkaline earth metal chloride is utilized as said secondary bed.

* * * * *